Aug. 23, 1949.  R. E. BRADLEY ET AL  2,479,810
LAWN MOWER WHEEL
Filed Jan. 30, 1946

INVENTORS,
Robert E. Bradley,
Joseph S. Sherer, Jr.
BY
Harness, Dickey & Pierce.
ATTORNEYS.

Patented Aug. 23, 1949

2,479,810

UNITED STATES PATENT OFFICE 2,479,810

LAWN MOWER WHEEL

Robert E. Bradley, Lansing, and Joseph S. Sherer, Jr., Grosse Pointe Farms, Mich., assignors to Reo Motors, Inc., Lansing, Mich., a corporation of Michigan Application January 30, 1946, Serial No. 644,232

10 Claims. (Cl. 301—5)

The invention relates broadly to lawn mowers and more particularly to a wheel construction therefor wherein the parts are uniquely combined and correlated to inhibit passage of foreign matter such as water, dust, grass clippings and the like, into the mechanism associated with the wheel.

In conventional lawn mower constructions the cutter reel shaft carries pinions which are driven by internal ring gears mounted in or associated with the ground-engaging traction wheels. This gearing, as well as the bearings which support the wheels and the cutter reel shaft, are relatively exposed, and trouble is sometimes caused by foreign matter which gains access to the working parts.

An important object of the invention is to provide a lawn mower wheel construction in which the parts are combined and correlated to prevent passage of foreign matter into the wheel and the mechanism associated therewith.

Another object of the invention is to provide a lawn mower wheel construction that is light in weight but heavy and massive in appearance.

Still another object of the invention is to provide a lawn mower wheel that is strong and rugged in construction and relatively inexpensive to manufacture.

Other objects and advantages of the invention will be apparent during the course of the following description.

Figure 1:
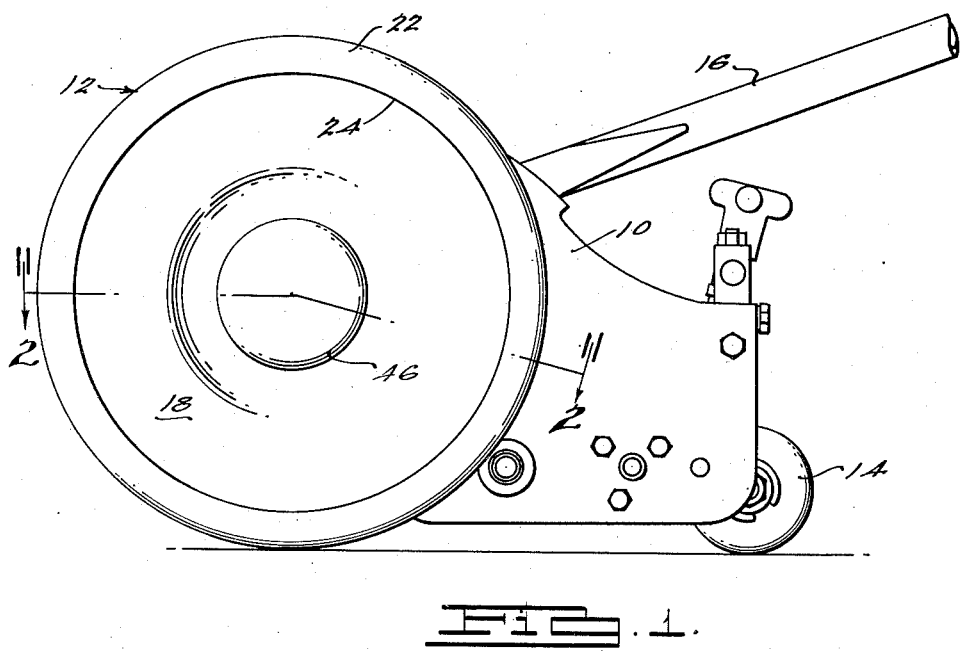
Figure 2:
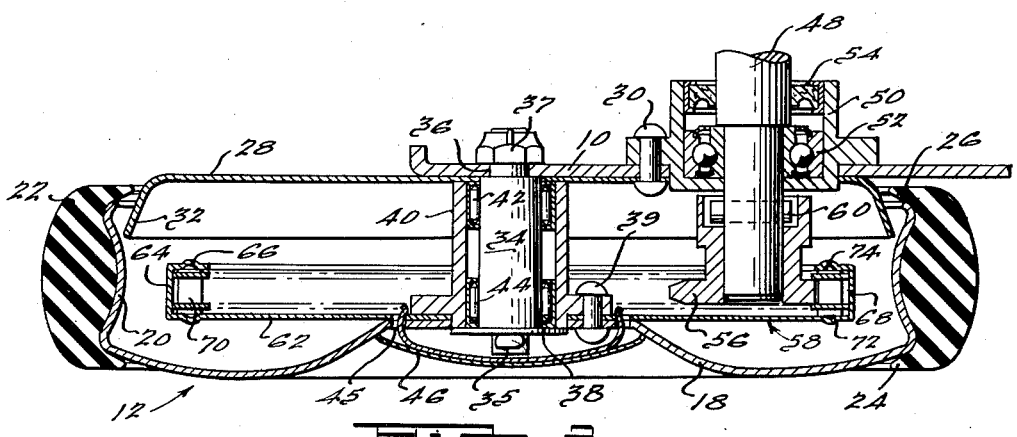

In the drawings forming a part of this specification and wherein like numerals are employed to designate like parts throughout the same, Fig. 1 is a side elevation of a lawn mower equipped with a wheel embodying the invention, and Fig. 2 is a fragmentary, transverse sectional view taken on the line 2—2 of Fig. 1.

Considered in certain of its broader aspects, the lawn mower wheel embodying the present invention is formed from sheet metal and includes a laterally extending rim portion which supports a rubber tire. It is an important feature of this invention that the tire is formed at its inner edge with an inwardly extending annular lip which projects over the corresponding edge of the rim. Mounted on the side frame of the lawn mower and disposed at the inner side of the wheel is a stationary backing plate which has a laterally extending and flared, flange portion. This flange extends into the wheel and behind the overhanging lip of the tire and its peripheral edge is disposed in slight spaced relation with the inner surface of the rim. Thus, the flange and lip are arranged in spaced but overlapping relation and a double seal is provided, one between the flange and the lip and the other between the flange and the rim. In practice, this sealing arrangement has proved to be extremely efficacious in preventing passage of foreign matter into the wheel.

For a more detailed description of the invention reference is had to the accompanying drawings wherein is shown a lawn mower having the usual side frame 10. At its forward end the frame 10 is supported by ground-engaging wheels 12, and at its rearward end the frame is supported by a ground-engaging roller 14 in the conventional manner. The usual handle 16 is provided for propelling the lawn mower.

As suggested, the instant invention is primarily concerned with the construction of the wheels 12, and attention is therefore directed to Fig. 2 which shows one of these wheels in detail. It is to be understood that the ground-engaging traction wheels 12 are similar in construction and operation and a detailed description of but one will therefore be given.

The wheel 12 preferably is made of sheet metal and has an outer disk-shaped portion 18 and an integral, laterally extending peripheral flange or rim 20. Mounted on the rim 20 is an annular tire 22 of rubber, or the like. At opposite sides thereof the tire 22 is formed with inwardly extending lips 24 and 26 which overhang the adjacent portions of the rim 20 and hold the tire firmly on the wheel. If desired, the rim 20 can be curved transversely, as shown in the drawings, to assist in holding the tire 22 on the wheel. Since the tire 22 is inherently resilient and flexible, it can readily be slipped onto the rim 20 by stretching the inner lip 26.

The wheel 12 is disposed beside the frame 10 and the backing plate 28, which is attached to the frame by rivets 30, has an annular and flared flange portion 32 which extends into the wheel and behind the lip 26. As clearly shown in the drawing, the periphery of flange 32 extends into close but spaced relation with respect to the inner surface of rim 20 to effect a seal at this point which will prevent all but very fine foreign matter from gaining access into the wheel. Since the rim 20 rotates around the backing plate 28, it is necessary that some clearance exist therebetween, but it is also apparent that this clearance can be very slight. Since flange 32 extends axially behind lip 26, these parts are in over-lapping relation and therefore provide a second line of seal between the wheel and the backing plate to prevent straight line movement of foreign matter into the interior of the wheel. Preferably, the clearance between the lip and flange also is relatively small, whereby to render the sealing relationship therebetween as effective as possible. Thus the backing plate cooperates with the wheel to provide two separate seals for preventing foreign material from finding its way to the interior of the wheel.

The wheel 12 is provided with an axle structure comprising a cylindrical stub axle member 34 having reduced concentric end portions. The inner reduced portion of axle 34 projects through an opening 36 in the frame 10 in which it is closely received and inwardly of the backing plate threadably receives the nut 37 which acts to rigidly secure the axle member to the frame 10. A washer 38 is received over the outer reduced portion of the axle member 34 against the radial shoulder formed at this point and is held against outward movement thereon by means of the cotter pin 35. The wheel 12 is provided with a hub member 40 fixed to the disk 18 by means of rivets 39. The hub 40 is of slightly less length than the distance between the washer 38 and the backing plate 28 and is received in surrounding relation with respect to the member 34 and mounted for rotation thereon by means of the antifriction bearings 42 and 44. The washer 38 is of sufficient diameter to overlap the outer end of the hub 40 and thus maintain the hub 40 and consequently the wheel, against relative axial movement on the axle member 34. Access is had to cotter pin 35 through a central opening 45 in the disk 18 and a suitable hub cap 46 is removably mounted on the wheel to close the opening and conceal the outer end of the hub 40 and axle member 34.

Also supported by the side frame 10 is the usual cutter reel shaft 48. As shown in the drawings, the terminal portion of this shaft extends through a bearing housing 50 which is attached to the side frame 10 by the rivets 30. The shaft is supported in housing 50 by a suitable bearing 52. Disposed in the end of housing 50 and around shaft 48 is a suitable sealing ring 54 which prevents dirt and other foreign matter from gaining access into the housing. Mounted on the projecting end of shaft 48 is a pinion 56 which meshes with an internal ring gear 58 carried by the wheel. Pinion 56 is drivingly connected to the shaft 48 by a cross pin 60. Internal ring gear 58 preferably is made of sheet metal and includes a disk-shaped central portion 62 which may conveniently be attached to the axle housing 40 by the rivets 39. At its periphery the disk portion 62 is provided with a lateral rim 64 and the latter is provided with a re-entrante outer flange portion 66. The sheet metal portions of the ring gear 58 define an internal annular channel 68 which holds the circumferentially spaced rollers 70. Each of the rollers 70 is mounted for rotation on a suitable pin, and the ends of the roller shafts fit in suitable indentations or sockets 72 and 74 provided in the side walls of channel 68. From the foregoing it will be readily apparent that, when traction wheel 12 moves along the ground surface, it rotates the internal ring gear 58 which in turn drives the cutter reel through the medium of shaft 48 and pinion 56.

Grass clippings, dirt, and other foreign matter kicked up by wheels 12 or the cutter reel is prevented from gaining access into the wheel and the various bearings and gearing associated therewith by the unique manner in which backing plate 28 is associated with rim 20 and tire 22. By reason of the close fit between these parts and the overlapping relation between lip 26 and the flared flange 32, all but the very finest matter is prevented from passing into the wheel and direct passage of all matter is absolutely precluded. Furthermore, if wet grass is cut with a conventional lawn mower, water accumulates on the wheels and runs into the bearings and other working parts. Since these parts are covered, the water is not easily removed and frequently causes extensive rusting and other damage. In the instant invention, any water which drops from the tires 22 is deflected outwardly by the flange 32. It will be observed that the flange 32 approaches rim 20 at one side of the central annular groove in the latter so that any water which falls from the flange drops onto the outwardly curved surface of the rim and is deflected outwardly. Thus the unique shape and correlation of the parts efficaciously prevents water, as well as solid foreign matter, from gaining access into the wheel.

It is to be understood that the form of the invention herewith shown and described is to be taken as the preferred example of the same and that various changes in the size, shape, and arrangement of parts may be resorted to without departing from the spirit of the invention or the scope of the appended claims.

We claim:

1. In a lawn mower construction, a wheel; a tire of resilient material on the wheel having an inwardly extending lip; a stationary backing plate having a laterally extending and flared flange portion arranged behind and in overlapping relation with said lip.

2. A lawn mower construction comprising a wheel; a tire of resilient material on the wheel having an inwardly extending annular lip at the inner side thereof; a stationary backing plate adjacent said wheel having a laterally extending flange portion, parts of said flange portion disposed axially behind and adjacent to said lip whereby to prevent direct passage of foreign matter therebetween.

3. A lawn mower construction comprising a wheel; a tire of resilient material on the wheel having an inwardly extending lip; and a stationary backing plate having a laterally extending and flared flange portion disposed in sealing relation with said lip.

4. In a lawn mower construction a wheel having a laterally extending peripheral rim portion; a tire of resilient material on said rim portion and formed with an inwardly extending annular lip at the inner side thereof; and a stationary backing plate having a laterally extending and flared flange portion, said latter portion being disposed behind said lip and in sealing relation with said rim.

5. In a lawn mower construction, a wheel having a laterally extending rim; a tire of resilient material mounted on the rim and formed with an inwardly extending lip at the inner side thereof; a stationary backing plate having a laterally extending and flared flange projecting into the wheel and axially behind said lip.

6. In a lawn mower construction, a wheel having a laterally extending rim; a tire of resilient material mounted on the rim and formed with an inwardly extending lip at the inner side thereof; and a stationary backing plate having a laterally extending and flared peripheral flange arranged behind and in overlapping relation with the lip, the edge of said flange disposed in sealing relation with the inner surface of said rim.

7. In a lawn mower construction, a wheel having a laterally extending rim; a tire of resilient material mounted on the rim and formed with an inwardly extending lip at the inner side thereof; and a stationary backing plate having a laterally extending and flared flange projecting into the wheel, said flange disposed in proximity to the inner surface of the rim and arranged in spaced but overlapping relation with said lip whereby to provide a double seal to entry of foreign matter into the wheel.

8. In a lawn mower construction, a sheet metal wheel having a laterally extending rim portion; a tire of resilient material on said rim portion having an inwardly extending annular lip at the inner side thereof which projects over the inner edge of said rim; and a stationary backing plate having a laterally extending and flared flange portion, said flange projecting into the wheel and arranged with its periphery in slight spaced relation with the inner surface of said rim, said flange extending behind and in overlapping relation with said lip, the arrangement being such that a sealing relation is established between the flange and both the rim and the lip to inhibit entry of foreign matter into the wheel.

9. In a lawn mower construction, a wheel having a laterally extending rim, the outer marginal portion of said rim having a flared inner surface; and a stationary backing plate having a laterally extending and flared peripheral flange which projects into the wheel, the periphery of said flange disposed in slight spaced relation with the flared surface of the rim whereby the two flared surfaces cooperate to prevent entry of water and other foreign matter into the wheel.

10. In a lawn mower construction, a wheel having a laterally extending rim the outer marginal portion of which flares outwardly; a tire of resilient material on the rim provided at its inner edge with a radially inwardly extending annular lip disposed in overhanging relation to said rim; and a stationary backing plate having a laterally extending and flared peripheral flange which projects into the wheel and is arranged behind and in overlapping relation with said lip, the periphery of said flange disposed adjacent to but in circumferentially spaced relation with the flared portion of the rim whereby water entering the wheel on said flange falls onto the flared surface of said rim and is directed outwardly thereby, and whereby any water falling from the lip onto said flange is prevented from flowing into the wheel by the flared portion of said flange disposed behind said lip, to prevent entry of water and other foreign matter into the wheel.

ROBERT E. BRADLEY.
JOSEPH S. SHERER, Jr.

REFERENCES CITED

The following references are of record in the file of this patent:

UNITED STATES PATENTS

| Number | Name | Date |
| --- | --- | --- |
| 1,145,516 | Schmid-Roost | July 6, 1915 |
| 1,382,089 | Johnston et al. | June 21, 1921 |
| 1,395,770 | Rector | Nov. 1, 1921 |
| 1,456,966 | Benson | May 27, 1923 |
| 1,546,513 | Sipes | July 21, 1925 |
| 1,724,902 | Bentley | Aug. 20, 1929 |
| 2,138,786 | Funk | Nov. 29, 1938 |
| 2,287,236 | Frank | June 23, 1942 |
| 2,332,754 | Rietz | Oct. 26, 1943 |